United States Patent
Svajda et al.

(10) Patent No.: US 9,651,421 B2
(45) Date of Patent: May 16, 2017

(54) DEVICE INCLUDING MULTI-FUNCTION CIRCUITRY HAVING OPTICAL DETECTORS AND METHOD OF FLIP-CHIP ASSEMBLY THEREFOR

(75) Inventors: Miroslav Svajda, San Jose, CA (US); Steve Gerber, Austin, TX (US); Wayne T. Holcombe, Mountain View, CA (US)

(73) Assignee: Silicon Laboratories, Inc., Austin, TX (US)

( * ) Notice: Subject to any disclaimer, the term of this patent is extended or adjusted under 35 U.S.C. 154(b) by 688 days.

(21) Appl. No.: 12/948,632

(22) Filed: Nov. 17, 2010

(65) Prior Publication Data

US 2011/0248961 A1 Oct. 13, 2011

Related U.S. Application Data

(60) Provisional application No. 61/323,798, filed on Apr. 13, 2010.

(51) Int. Cl.
| | |
|---|---|
| G09G 5/00 | (2006.01) |
| G01J 1/42 | (2006.01) |
| G01S 3/78 | (2006.01) |
| G01S 3/783 | (2006.01) |
| G01S 7/481 | (2006.01) |
| G01S 7/491 | (2006.01) |
| G01S 7/497 | (2006.01) |
| G01S 11/12 | (2006.01) |
| G01S 17/02 | (2006.01) |
| G01S 17/46 | (2006.01) |

(Continued)

(52) U.S. Cl.
CPC ............ *G01J 1/4204* (2013.01); *G01J 1/44* (2013.01); *G01S 3/7803* (2013.01); *G01S 3/7835* (2013.01); *G01S 7/4811* (2013.01); *G01S 7/497* (2013.01); *G01S 7/4913* (2013.01); *G01S 7/4972* (2013.01); *G01S 11/12* (2013.01); *G01S 17/026* (2013.01); *G01S 17/08* (2013.01); *G01S 17/46* (2013.01); *G01V 8/20* (2013.01)

(58) Field of Classification Search
CPC .......... G01S 7/4972; G01S 17/08; G01J 1/44
USPC ........................................ 345/175, 173, 156
See application file for complete search history.

(56) References Cited

U.S. PATENT DOCUMENTS

| | | |
|---|---|---|
| 5,502,785 A | 3/1996 | Wang et al. |
| 6,277,668 B1 | 8/2001 | Goossen et al. |

(Continued)

FOREIGN PATENT DOCUMENTS

JP          01-134953 A   *   5/1989

*Primary Examiner* — William Boddie
*Assistant Examiner* — Leonid Shapiro
(74) *Attorney, Agent, or Firm* — Cesari & Reed, LLP; R. Michael Reed (57) ABSTRACT

A device includes a substrate is substantially transparent and includes a contact surface and an interface surface. The interface surface includes a plurality of electrical contacts. The device further includes a semiconductor die, which includes a plurality of connections, a first photo detector and a second photo detector. Each of the plurality of connections includes a connection bump formed thereon to couple to the plurality of electrical contacts of the interface surface of the substrate. The plurality of connections positioned relative to the first and second photo detectors to alter a directional response of at least one photo detector of the plurality of photo detectors.

21 Claims, 5 Drawing Sheets

(51) Int. Cl.
*G01V 8/20* (2006.01)
*G01J 1/44* (2006.01)
*G01S 17/08* (2006.01)

(56) References Cited

U.S. PATENT DOCUMENTS

| | | | |
|---|---|---|---|
| 7,391,005 B2 | 6/2008 | Sherazi et al. | |
| 2002/0020859 A1* | 2/2002 | Muramatsu | 257/228 |
| 2006/0049338 A1* | 3/2006 | Sherazi et al. | 250/214 R |
| 2008/0198143 A1* | 8/2008 | Kinoshita et al. | 345/175 |
| 2010/0149125 A1* | 6/2010 | Klinghult et al. | 345/174 |
| 2010/0260314 A1* | 10/2010 | Kotooka | 378/19 |
| 2010/0276575 A1 | 11/2010 | Sherazi et al. | |

* cited by examiner

DEVICE INCLUDING MULTI-FUNCTION CIRCUITRY HAVING OPTICAL DETECTORS AND METHOD OF FLIP-CHIP ASSEMBLY THEREFOR

CROSS-REFERENCE TO RELATED APPLICATION(S)

This application is a non-provisional of and claims priority from U.S. Provisional Patent Application No. 61/323, 798 filed on Apr. 13, 2010 and entitled "APPARATUS WITH OPTICAL FUNCTIONALITY AND ASSOCIATED METHODS," which is incorporated herein by reference in its entirety.

FIELD

The present disclosure is generally related to optical detectors, and more-particularly to a device having multi-function circuitry with optical detectors flip-chip mounted to a transparent portion of a touch screen substrate.

BACKGROUND

Conventional systems exist that are designed to interpret user motion as input to a system. For example, proximity detectors are commonly used to activate motion lights. Further, touch screen systems, such as track pads, mobile telephone interfaces, information kiosks, and various other computing devices can be configured to use capacitive sensors to identify a location on the touch screen corresponding to the user's interaction with the touch screen via a stylus or finger. In such systems, changes in capacitance can be interpreted to determine a contact location and/or to detect motion.

Another technique for detecting motion can include optical sensors that are configured to capture optical input on a pixel-by-pixel basis and to identify motion by analyzing changes in the pixel data. Optical sensor circuitry typically requires a transparent window through which reflected light can be received. However, transparent packaging of an integrated circuit die is more expensive than typical opaque packaging. Further, such optical sensor circuitry may have stringent pad requirements and low pad density for coupling to other circuitry.

SUMMARY

In an embodiment, a device includes a substrate that is substantially transparent and that includes a contact surface and an interface surface, which has a plurality of electrical contacts. The device further includes a semiconductor die having a plurality of connections and a plurality of photo detectors. Each of the connections has a connection bump formed thereon to couple to the plurality of electrical contacts of the interface surface of the substrate. The plurality of connections is positioned relative to the plurality of photo detectors to alter a directional response of at least one of the plurality of photo detectors.

In another embodiment, a computing device includes a touch-screen substrate with an interface surface having an interconnect layer. The touch-screen substrate includes a substantially transparent portion. The computing device further includes a semiconductor with a plurality of connections, a first photo detector and a second photo detector. Each of the plurality of connections has a connection bump formed thereon. The semiconductor die is mounted to the interconnect layer to electrically and physically couple the integrated circuit die to the touch-screen substrate. The plurality of connection bumps alter directional characteristics of the first photo detector and the second photo detector, such that the first photo detector has a first directional response that is different with respect to a second directional response of the second photo detector.

In still another embodiment, a method includes calibrating a plurality of photo detectors of a multi-function integrated circuit to determine ambient light conditions. The multi-function integrated circuit is flip-chip mounted to an interconnect layer of a substantially transparent portion of a touch-screen substrate. The multi-function integrated circuit includes the plurality of photo detectors and a plurality of connections, where each connection has a connection bump of a plurality of connection bumps formed thereon. The plurality of connections are positioned such that the plurality of connection bumps cooperate to alter a directional response of a first photo detector of the plurality of photo detectors relative to a second photo detector of the plurality of photo detectors. The method further includes determining a proximity of an object relative to the touch-screen substrate based on electrical signals produced by the plurality of photo detectors and based on calibrating the plurality of photo detectors, where the electrical signals are proportional to the light received by the plurality of photo detectors.

DETAILED DESCRIPTION OF ILLUSTRATIVE EMBODIMENTS

In the following description, the use of the same reference numerals in different drawings indicates similar or identical items.

In the following discussion of the illustrated embodiments, various elements are depicted as being connected to one another. However, it should be understood that the various embodiments may include additional circuit elements (not shown) through which such connections are made. Accordingly, in the following discussion, the term "coupled" includes, but is broader than, a direct connection.

Figure 1:
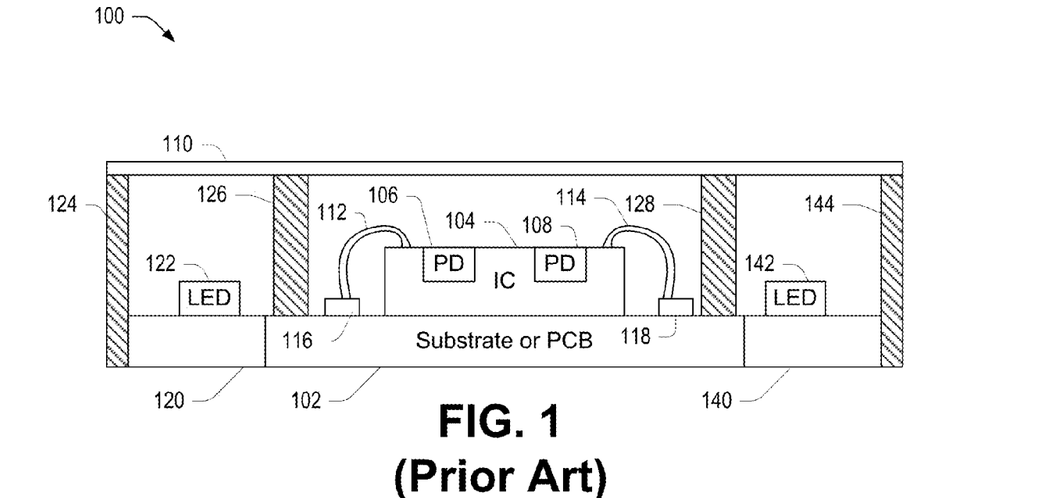
FIG. 1 is a partial cross-sectional view and partial block diagram of a representative example of a conventional device configured to provide optical proximity/motion detection.

FIG. 1 is a partial cross-sectional view and partial block diagram of a representative example of a conventional device 100 configured to provide optical proximity/motion detection. Device 100 includes a substrate or printed circuit board (PCB) 102 coupled to integrated circuit 104, which includes photo diodes 106 and 108, by bond wires 112.

Device 100 further includes circuit 120 including a light-emitting diode (LED) 122 and circuit 140 including LED 142. Optical barriers 124, 126, 128, and 144 provide at least partial optical isolation between LEDs 122 and 142 and photo diodes 106 and 108. Device 100 also includes an optically transparent overlay 110 that extends over LEDs 122 and 144 and over integrated circuit 104 providing optically transparent windows over LED 122, LED 142, and photo diodes 106 and 108.

Wire bonds 112 and 114 with an additional substrate with an interconnect layer provide a connection to the LEDs 122 and 142 and control circuitry (not shown). Additionally, spacing may be provided between the transparent window and the surface of photo detectors 106 and 108 to allow room for the wire bonds 112 and 114, which can make the device 100 susceptible to parasitic light coupling from LEDs 122 and 142. Separation and reducing the size of the optically transparent windows may reduce the parasitic light coupling, but may limit the directional response of the photo diodes 106 and 108. One example of this technique is depicted in FIG. 2.

Figure 2:
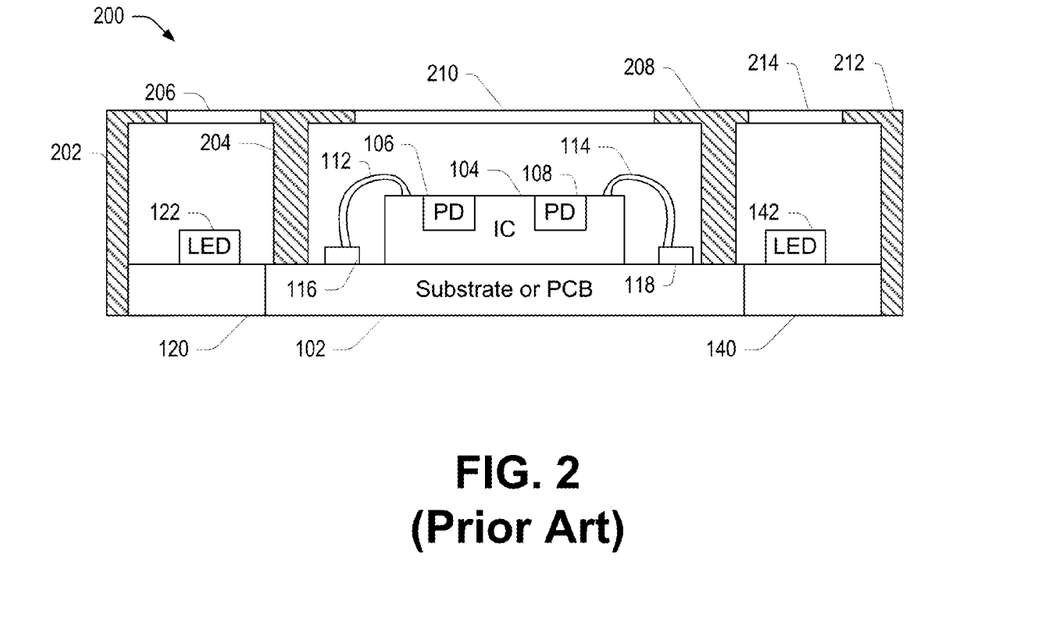
FIG. 2 is a partial cross-sectional view and partial block diagram of a second example of the device of FIG. 1 including optically transparent windows separated by opaque light barriers.

FIG. 2 is a partial cross-sectional view and partial block diagram of a device 200 representing a second example of the device 100 of FIG. 1 including optically transparent windows separated by opaque light barriers. In the illustrated example, opaque light barriers 202 and 204 define an optically transparent window 206. Opaque light barriers 204 and 208 define an optically transparent window 210. Opaque light barriers 208 and 212 define an optically transparent window 214. Optically transparent windows 206, 210, and 214 have enhanced directionality, relative to the optically transparent windows over LED 122, LED 142, and photo diodes 106 and 108 in FIG. 1. In particular, at least a portion of the opaque light barriers 202, 204, 208, and 212 extend in a direction that is substantially parallel to the substrate or PCB 102, reducing the size of the optical openings over LEDS 122 and 142 and over photo diodes 106 and 108 and thereby reducing the parasitic light coupling from LEDs 122 and 142.

Substrate or PCB 102 may parasitically light-couple LEDs 122 and 142 to photo detectors 106 and 108, which may reduce the optical sensitivity of the device.

Embodiments of a device are described below that provide seamless integration of optical detection circuitry with capacitive touch screen circuitry. In particular, a multi-function circuit includes an active surface including a plurality of photo detectors (such as photo diodes or other optical detectors) and a plurality of connections having connection bumps formed thereon and configured to flip-chip mount to an interconnect layer of a touch screen substrate. The connection bumps are formed from electrically conductive material configured to form an electrical connection and that can achieve a high interconnect density. Such connection bumps are sometimes formed from gold or a solder-type material and may be referred to as "solder bumps" or "solder balls." A transparent underfill may be applied around the connection bumps and between the multi-function circuitry and the capacitive touch screen. Further, an opaque encapsulant may be provided over the non-active surface of the multi-function circuit and extend to the touch screen substrate.

Connecting the multi-function circuit to the interconnect layer using the connection bumps reduces cost and complexity associated with using transparent packaging materials, reduces cost overhead, reduces the spacing between the optically transparent cover 302 and the photo detectors and allows seamless integration between, for example, a capacitive array of the touch screen substrate with a multi-function circuit die, which may implement a capacitive sensor, a proximity sensor, a motion sensor, and/or other functionality. Further, the connection bump-type of interconnection reduces the die area by relaxing the pad requirements, offering higher pad density. Moreover, by placing the connections and the photo detectors on the active surface, transparent touch screen area can be used as the shared optical window for multiple photo detectors, reducing the number of optical windows while enabling cost-effective gesture/motion detection functionality. The connection bumps may be configured to act as a light shield to optically separate multiple photo detectors on the active surface of the multi-function circuit die, providing spatially dependent light reception that can be used for motion/gesture detection. In particular, the plurality of connection bumps alters directional characteristics of the photo detectors, such that each photo detector has a different directional response relative to other photo detectors.

By coupling the multi-function circuit to the interconnect layer of a transparent touch screen, the resulting device reduces the system area as compared to a device having separate optical windows and improves optical isolation between the photo detectors and an associated light source (such as a light-emitting diode). Integration with the touch screen also enables measurement of ambient light and light type for control of backlight intensity including backlight calibration. Integration with an image sensor enables measurement of ambient light for control of image sensor settings such as white balance.

Figure 3:
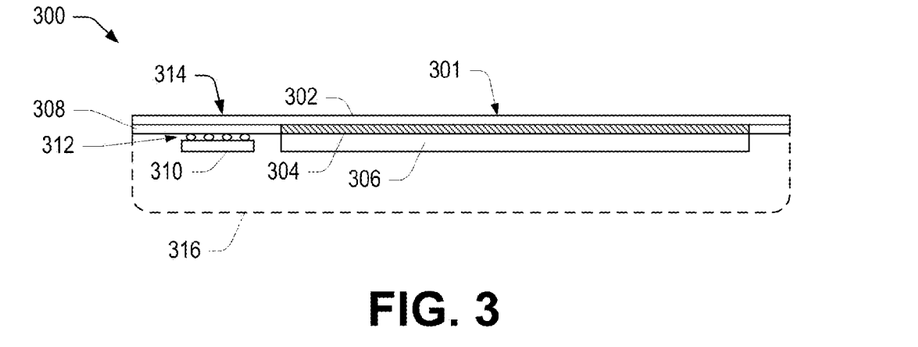
FIG. 3 is a block diagram of an embodiment of a device in profile including a touch-screen interface and including a multi-function circuit having multiple photo detectors that is flip-chip mounted to an interface layer of the touch-screen such that connection bumps at least partial determine directional response characteristics of the photo detectors.

FIG. 3 is a block diagram of an embodiment of a device 300 in profile including a touch-screen interface 301 and including a multi-function circuit 310 having multiple photo detectors that is flip-chip mounted to a connection interface layer 308 of the touch-screen such that connection bumps 312 at least partial determine directional response characteristics of the photo detectors. Device 300 includes a lens or optically transparent cover 302 coupled to a capacitive array 304, which is coupled to a display circuit 306, such as a liquid crystal display (LCD).

Device 300 further includes at least one infrared (IR) transparent window 314 through the optically transparent cover 302, which may have reduced transparency in visible spectrum to allow seamless integration with the housing 316. IR transparent window 314 extends over multi-function circuit 310, which includes connections having connection bumps 312 formed thereon for electrically and physically coupling multi-function circuit 310 to connection interface layer 308. Device 300 further includes a housing 316 (shown in phantom), which defines a cavity within which multi-function circuit 310, capacitive array 304, and display circuit 306 are housed.

Figure 5:
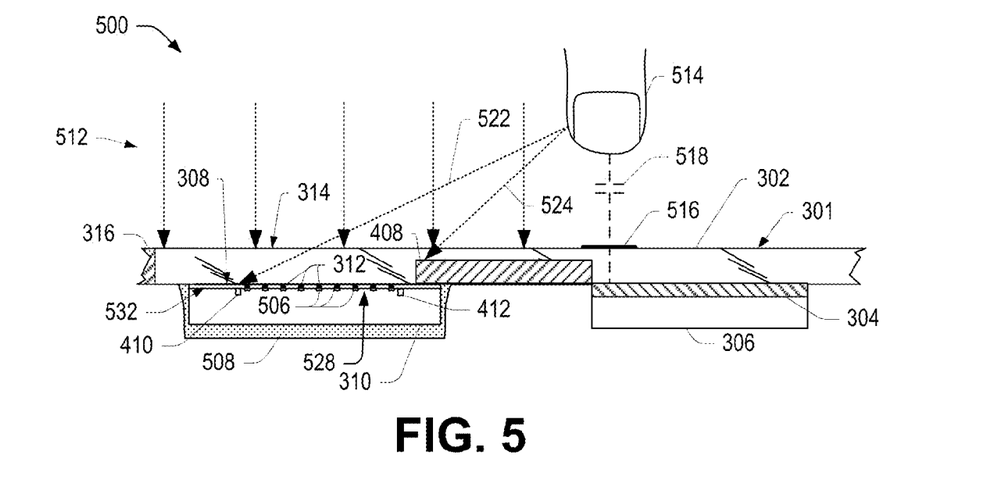
FIG. 5 is a cross-sectional view of a second embodiment of a device, such as the device of FIG. 3, including lines showing incident light, reflected light and electrical field-line coupling between a capacitive array of the device and a finger tip.

In operation, multi-function circuit 310 couples to connection interface layer 310 via connection bumps 312, which optically separate photo detectors (such as photo detectors 502 and 504 depicted in FIG. 5). This "flip-chip" type of connection allows multi-function circuit 310 to share the optically transparent cover, rather than a separate optical cover, while allowing for less spacing between the multi-function circuit 310 and opaque light barriers since bond wires are not used. Further, connections and associated connection bumps can operate as opaque light barriers and can be arranged to alter directional characteristics of the photo detectors such that each photo detector has a different directional response with respect to another photo detector of the multi-function circuit 310.

Figure 4:
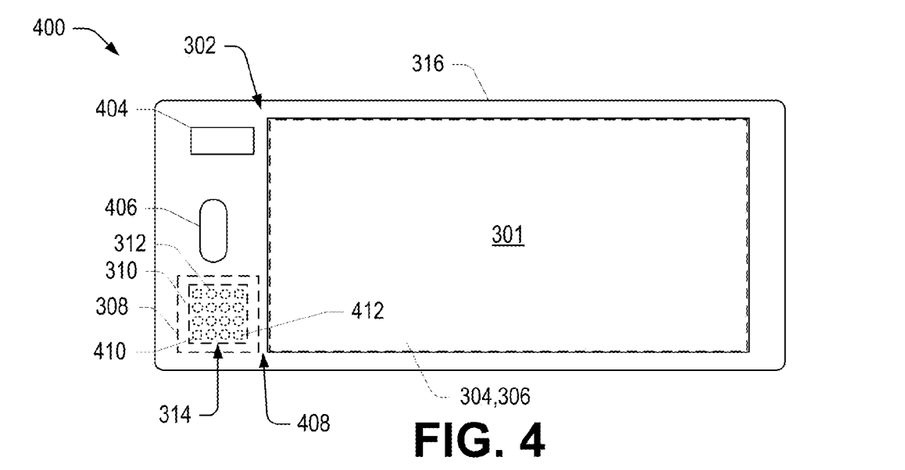
FIG. 4 is a top view of the device of FIG. 3 including the touch-screen interface and including the multi-function circuit depicted in phantom.

FIG. 4 is a top view of a device 400, such as the device 300 of FIG. 3, including the touch-screen interface 301 and including the multi-function circuit 310 depicted in phantom. Device 400 includes housing 316 with optically transparent cover 302. Device 400 further includes capacitive array 304 and display circuit 306, which cooperate to provide the touch-screen interface 301. Further, device 400 includes optically transparent window 314 over connection interface layer 308, which couples to multi-function circuit 310 through connection bumps 312. Multi-function circuit 310 includes photo detectors 410 and 412, which are optically separated by connection bumps 312. Additionally, device 400 includes an optical window 404 over an LED, such as LED 122 in FIGS. 1 and 2. Device 406 further includes an opening 406 adjacent to a speaker (not shown) for providing audible sounds.

In operation, device 400 is operable to provide both touch-screen functionality through capacitive array 304 and optical proximity detection, motion detection, and/or gesture recognition functionality via multi-function circuit 310. Connection bumps 312 cooperate to separate photo detectors of multi-function circuit 310, such that each of the photo detectors has a different directional response as compared to other photo detectors of the multi-function circuit 310.

Further, portions of the housing 316 may provide opaque light barrier functionality, such as in the area 408 between transparent optical window 304 and touch-screen interface 301. An illustrative example of such an opaque light barrier is described below with respect to FIG. 5.

FIG. 5 is a cross-sectional view of a device 500, such as the devices 300 and 400 of FIGS. 3 and 4, including lines showing incident light 512, reflected light 522 and 524, and field-line coupling 518 between capacitive array 304 and a finger tip 514. Incident light 512 includes ambient light that falls on translucent cover layer 302. One or more LEDs, such as LEDs 122 and 124, represent infrared light sources, which are the sources for reflected light 522 and 524. Finger tip 514 blocks at least some of the incident light 512, casting a shadow on the surface of translucent cover layer 302. Further, proximity of finger tip 514 produces a capacitance 518 between finger tip 514 and capacitive array 304 beneath translucent cover layer 302. The capacitance 518 varies as a function of the distance between finger tip 514 and capacitive array 304.

Multi-function circuit 310 includes a plurality of connections 506 having connection bumps 312 formed thereon for electrically and physically coupling multi-function circuit 310 to interconnect layer 308. Further, multi-function circuit 310 includes photo detectors 410 and 412, which are optically separated by connection bumps 312. Device 500 includes an opaque, glop top type of encapsulant 508 deposited over multi-function integrated circuit 310 from a side opposite to an active surface 528 and extending over multi-function integrated circuit 310 to transparent touch-screen substrate 302 and/or to area 408. In this instance, area 408 of housing 316 serves as an opaque light barrier to block reflected light 524 from reaching photo detector 504. Further, in some instances, a transparent underfill 532 between connection bumps 312 and between multi-function integrated circuit 310 and interconnect layer 308.

During operation, control circuitry of multi-function integrated circuit 310 activates an LED, such as an LED 122 beneath optical window 404 in FIG. 4, to emit light in an infrared frequency spectrum to illuminate an area above transparent touch-screen substrate 302. At least some of the emitted light reaches finger tip 514, which directs reflected light 522 and 524 toward transparent touch-screen substrate 302. Finger tip 514 will reflect light across transparent touch-screen substrate 302, and that the relative strengths of reflected light 522 and 524 vary as a function of position of the finger tip 514 relative to the receiving photo detector 410 or 412. In particular, the strength of reflected light decreases as a function of distance. Accordingly, reflected light 522 is weaker than reflected light 524, though reflected light 524 is at least partially blocked from reaching photo detector 412 by portion 408. Further, in this example, at least one of connection bumps 312 blocks a portion of reflected light 522 from reaching photo detector 410, providing some spatial dependence with respect to the reflected light received by photo detectors 410 and 412.

By flip-chip mounting multi-function integrated circuit 310 having photo detectors 410 and 412 to the interconnection layer 308 of a touch-screen substrate including transparent touch-screen substrate 302, photo detectors 410 and 412 can be used to measure ambient light and light type for control of various functions, including backlight intensity. In particular, a typical backlight boost controller regulates current through the backlight LEDs (typically, white LEDs) by comparing an LED current to a reference current using an error amplifier, and the LED controller regulates the current to reduce the error output of error amplifier to substantially a zero value, thereby holding the LED current at a substantially constant level.

However, in the present example, control circuitry of multi-function integrated circuit 310 may use LED driver circuitry to control the current flowing through the backlight LED(s). For example, by completely (or nearly completely) turning off the backlight LEDs for a brief period, such as about 1 ms, before and during the ambient measurement, inaccuracies in measuring the backlight contribution to sensed ambient light incident on photo detectors 410 and 412 can be eliminated or nearly eliminated. Thus, multi-function integrated circuit 310 can include ambient light sensing functionality and backlight display illumination (or backlight LED) control without concern about high optical coupling between the backlight and the ambient light sensor, eliminating the need for a separate optically isolated port for the ambient light sensor functionality.

Further, control circuitry of multi-function integrated circuit 310 controls photo detectors 410 and 412 to measure ambient light close in time to measurements of reflected light. In particular, control circuitry turns off LED 122 (and optionally backlight LEDs (not shown)) and measures incident light 512, then turns on LED 122 and measures incident light 512 plus reflected light 522 and 524. If the control circuitry can control the LED driver to briefly disable the backlight LEDs for a brief period, such as less than 1 ms, multi-function integrated circuit 310 can capture a proximity measurement, then the backlight can be re-enabled, making it possible for proximity sensor functions to operate through the backlight display optics, without being adversely affected by the backlight LEDs or by light noise associated with the backlight LEDs, thus avoiding the use of a separate optically-isolated port. Once the measurements are captured, control circuitry subtracts the incident light measurement from the incident light plus reflected light measurement to obtain a proximity measurement.

While the above-described figures have depicted cross-sectional views of the device, the cross-sectional views are provided for illustrative purposes only and are not necessarily drawn to scale. Further, while the above-described figures depict a simplified view of the device in cross-section, an example of circuitry included within multi-function integrated circuit 310 is described below with respect to FIG. 6.

Figure 6:
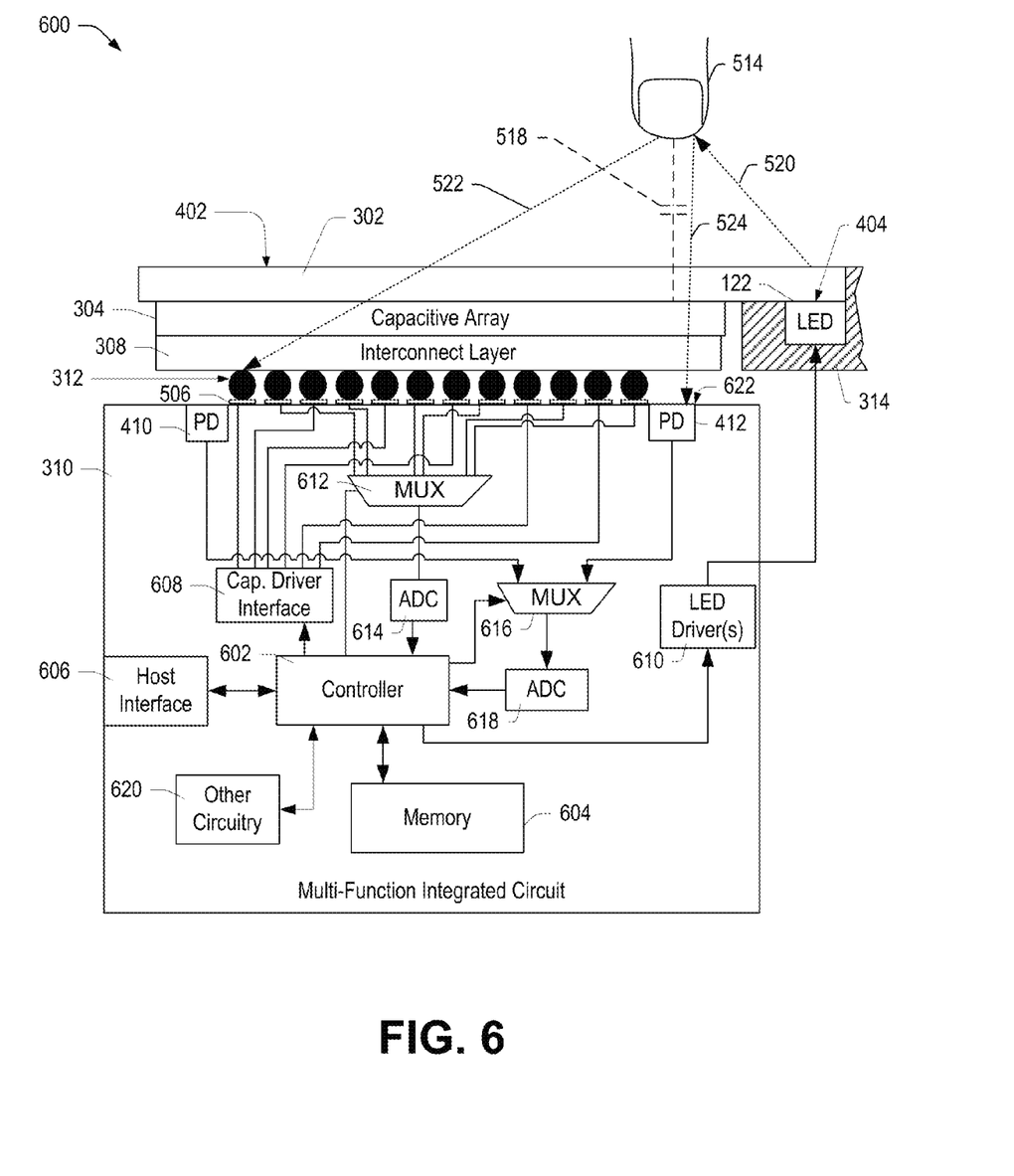
FIG. 6 is a partial cross-sectional view and partial block diagram of an embodiment of a device, such as the devices of FIGS. 3-5, including circuitry configured to implement multiple functions.

FIG. 6 is a partial cross-sectional and partial block diagram of an embodiment of a device 600, such as the devices 300, 400, and 500 of FIGS. 3-5. In the illustrated example, multi-function integrated circuit 310 includes a controller 602 coupled to a memory 604, a host interface 606, capacitive driver interface 608, one or more LED drivers 610, and other circuitry 620. Further, controller 602 includes inputs coupled to outputs of analog-to-digital converters (ADCs) 614 and 618.

Capacitive driver interface 608 includes a plurality of outputs coupled to some of the connections 506. Multi-function integrated circuit 310 further includes a multiplexer 612 including a plurality of inputs coupled to others of the connections 506, a control input coupled to controller 602, and an output coupled to an input of ADC 614. In an example, capacitive driver interface 608 is coupled to one electrode of a capacitive element of the capacitive array 304 through a first one of connections 506 and associated connection bump 312. One input of multiplexer 612 is coupled to the other electrode of the capacitive element to monitor an electrical signal through a second one of connections 506 and an associated one of connection bumps 312.

Multi-function integrated circuit 310 also includes a multiplexer 616 having a first input coupled to photo detector 410 to receive signals proportional to first incident light and a second input coupled to photo detector 412 to receive second incident light. Multiplexer 616 further includes a control input coupled to controller 602 and an output coupled to ADC 618.

In an example, controller 602 can be a processor configured to execute processor-readable instructions stored in memory 604 or received from a host system via host interface 606. Thus, controller 602 can be programmable to refine or otherwise alter performance of multi-function integrated circuit 310. Host interface 606 can be a serial interface, such as a universal serial bus (USB) interface, or another type of interface suitable for connecting another circuit or host system to multi-function integrated circuit 310. In an example, device 600 may be incorporated within a larger system, such as a mobile telephone or a laptop computer. In a particular example, transparent touch-screen substrate 302 and multi-function integrated circuit 310 may be used as a track pad within a laptop computer to provide pointer-control and gesture-recognition functionality, including multi-finger, pinch, and motion-based input functions.

In operation, controller 602 sends and receives data, control information and instructions to and from a host system through host interface 606. Controller 602 controls capacitive driver interface 608 to selectively apply a signal to one of the connections and controls multiplexer 612 to receive a signal from a corresponding bond pad that indicates proximity of an object to the associated capacitive element. Controller 602 may control capacitive driver interface 608 and multiplexer 612 to selectively sample capacitive elements of the capacitive array 304 sequentially and iteratively to monitor for changes in proximity of an object, such as finger tip 514. Controller 602 controls multiplexer 612 to provide the selected signal to ADC 614, which converts the selected signal to a digital signal and provides the digital signal to controller 602 for further processing or for communication to the host system via host interface 606.

Additionally, controller 602 controls LED driver 610 to turn off LED 122 and controls multiplexer 616 to sample signals produced by photo detectors 410 and 412. In particular, each photo detector 410 and 412 produces an electrical signal proportional to light incident on the respective photo detector 410 and 412. Controller 602 controls multiplexer 616 to provide a selected signal to ADC 618, which converts the selected signal to a digital signal and provides the digital signal to controller 602. In this instance, the digital signal represents ambient light measurements.

In an embodiment, controller 602 performs ambient light sensing functionality, proximity detection functionality, and motion sensing functionality. In one example, controller 602 can adjust a backlight level by a known ratio and use the resultant measured ambient light change to calculate the contribution of the backlight display to the total ambient measured, so as to produce a true or relatively true or correct ambient light measurement unaffected by the backlight in order to correctly adjust the backlight level. In one exemplary embodiment, controller 602 controls LED drivers 610 (which are coupled to backlight LEDs (not shown)) to reduce the backlight by one half. Controller 602 then controls photo detectors 410 and 412 to measure the change. The difference between before and after the change in backlight is equal to one half of the backlight contribution. In this example, controller 602 would double the measurement and subtract the product from the ambient level to determine the correct ambient level without backlight influence. In this example, controller 602 may have indirect or partial control over the backlight intensity.

Controller 602 controls LED driver 610 to turn on LED 122 and controls multiplexer 616 to sample signals produced by photo detectors 410 and 412, providing a selected signal to ADC 618, which converts the selected signal to a digital signal for controller 602. Controller 602 uses digital signals associated with photo detectors 410 and 412 to determine a position of finger tip 514 relative to capacitive array 304. Further, controller 602 determines relative motion of finger tip 514 based on changes in the digital signals. In a particular example, controller 602 determines proximity and motion as a function of ratios of reflectances and changes in the ratios of reflectances, respectively. For example, the intensity of the reflected light 524 would be greater than that of reflected light 522 because finger tip 514 is closer to photo detector 412 than to photo detector 410. In this instance, a ratio of reflectance 522 to 524 indicates a relative proximity of fingertip 514 to photo detectors 410 and 412. Subsequent measurements may reflect a change in the reflectance ratios. Differences between a first ratio of reflectances relative to a second ratio of reflectances can be used to detect motion of the fingertip 514 relative to the photo detectors 410 and 412.

Detection of motion and associated directionality can be interpolated to determine a motion-based user input. Further, controller 602 can be configured to perform more complex operations, such as gesture recognition, based on detected proximity and motion. In an example, controller 602 determines ratios of reflectances between adjacent photo detectors and detects motion based on differences in such ratios over time.

While the above-examples have depicted a row of connection bumps 312 and two photo detectors 410 and 412, multi-function integrated circuit may include any number of photo detectors and a two-dimensional array of connection bumps. Further, the specific arrangement or interleaving of connection bumps and photo detectors is limited only by manufacturing technologies and design complexity. More photo detectors may be included for enhanced optical resolution. Further, the connection bumps 312 may be combined with other optical barriers, such as opaque paint painted above photo detectors 410 and 412, light opaque pattern in the interconnect layer 308, or other non-transparent elements embedded within transparent touch-screen substrate 302 to enhance spatial dependence of incident light.

Additionally, while the above-examples have depicted photo detectors positioned on either side of a row of connection bumps, in other examples, one or more of the photo detectors may be positioned in the middle of an array of connection bumps such that the photo detector is surrounded by connection bumps. Further, the photo detectors may be positioned at peripheral corners of the array of connection bumps or at other positions relative to the array, depending on the implementation. Examples of two out of many possible arrangements of connection bumps and photo detectors on active surface 528 are described below with respect to FIGS. 7 and 8.

Figure 7:
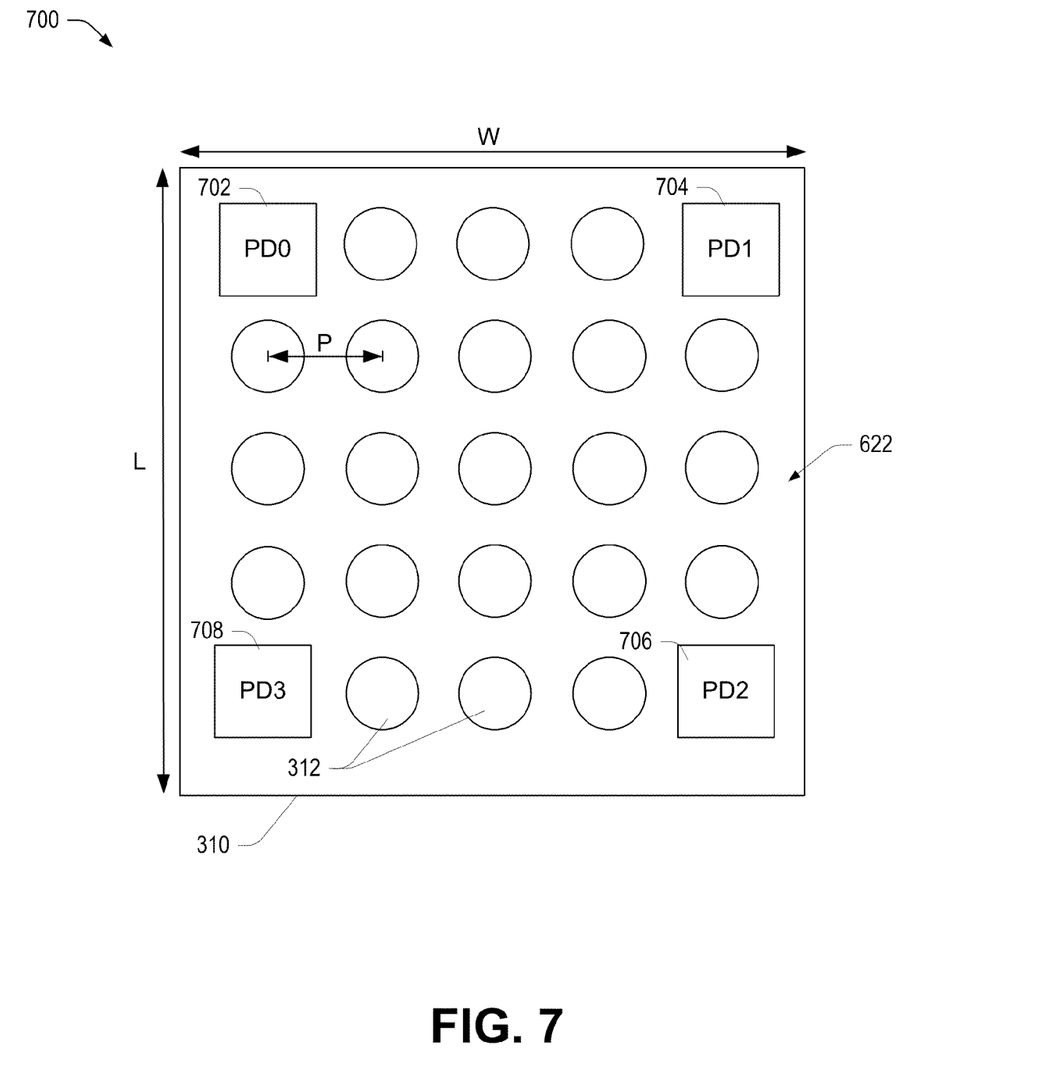
FIG. 7 is a top view of an embodiment of an active surface of the multi-function circuit of FIGS. 3-6 including photo detectors optically isolated from one another by connection bumps formed on connections of the multi-function circuit.

FIG. 7 is a top view of an embodiment 400 of an active surface 128 of the multi-function integrated circuit 310 of FIGS. 3-6 including photo detectors 702, 704, 706, and 708 optically isolated from one another by connection bumps 312 formed on connections of the multi-function integrated circuit 310. In this example, photo detectors 702, 704, 706, and 708 are positioned at corners of multi-function integrated circuit 310. Connection bumps 312 form a substantially evenly-spaced array of rows and columns. The array of connection bumps 312 optically isolates the photo detectors 702, 704, 706, and 708 from one another. The center-to-center spacing or pitch (P) between adjacent connection bumps 312 in a row or column is substantially equal within limits of manufacturing tolerance. In a particular example, the pitch is approximately 0.4 millimeters (mm).

Figure 8:
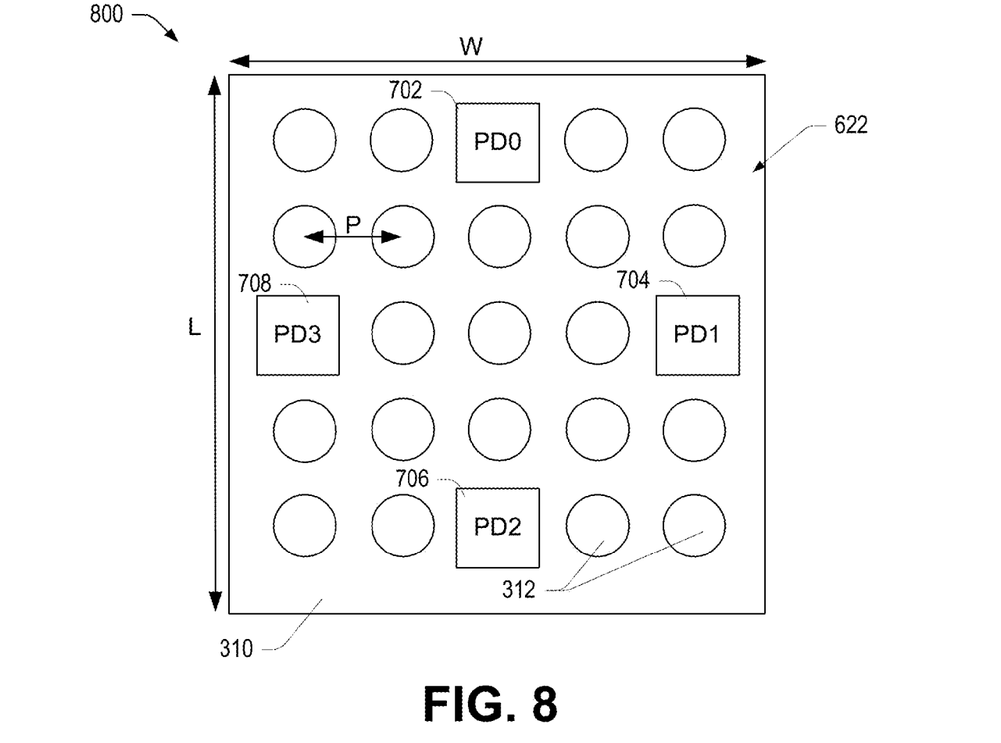
FIG. 8 is a top view of a second embodiment of the active surface of the multi-function circuit of FIGS. 3-6.

FIG. 8 is a top view of a second embodiment 800 of the active surface 528 of the multi-function integrated circuit 310 of FIGS. 3-6. In this example, photo detectors 702 and 706 are substantially centered along a width (w) of the active surface 528 of multi-function integrated circuit 310, and photo detectors 704 and 708 are substantially centered along a length (L) of active surface 528. Connection bumps 312 substantially surround each of photo detectors 702, 704, 706, and 708 on three sides. Further, connection bumps 312 provide optical isolation between photo detectors 702, 704, 706, and 708.

In general, by flip-chip mounting multi-function integrated circuit 310 to transparent touch-screen substrate 302 and by providing photo detectors 410 and 412 (or 702, 704, 706, and 708) on active surface 528, packaging issues and cost overhead are reduced. In particular, the transparent, transparent touch-screen substrate 302 can be shared by capacitive array 304, backlight LED circuitry, and optical proximity/motion/gesture detection circuitry, reducing the number of transparent windows needed to implement such detection functionalities. Further, the connection bump allows seamless integration with capacitive touch screens. Additionally, the connection reduces the die area by relaxing pad requirements and offering higher pad density. Moreover, the amount of optical windows required by the photo detector circuitry is reduced, enabling cost-effective gesture/motion functionality. The resulting device uses less system area and improves optical isolation between photo detectors and the LED(s). Moreover, integration with the touch screen substrate 104 also enables measurement of the ambient light and light type for control of the backlight intensity through the same window by which the backlighting is provided.

Additionally, connection bumps 312 act as light shields to optically separate or isolate multiple photo detectors on the die, allowing for motion detection based on spatially dependent incident light measurements. In particular, the connection bumps 312 optically isolate the photo detectors from one another. While reflected light from an object provides different reflectances to the different photo detectors as a function of the relative position of the object, connection bumps 312 block some of the reflected light, enhancing differences in the strength of the reflected light based on the position of the object and providing enhanced spatial-dependence between the photo detectors.

Figure 9:
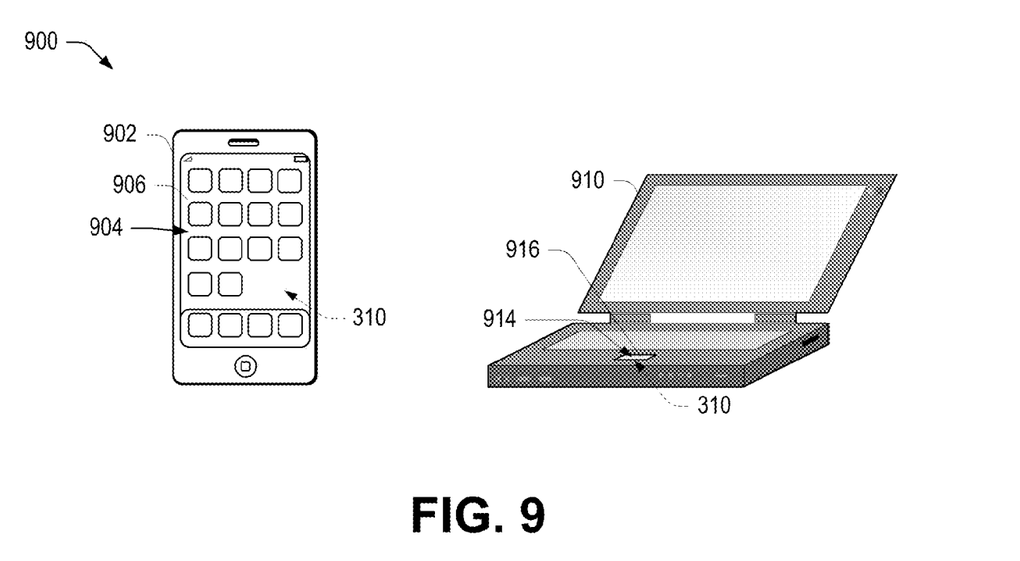
FIG. 9 is a diagram of two possible electronic devices within which the multi-function circuit of FIGS. 3-8 can be incorporated.

FIG. 9 is a diagram 900 of two representative electronic systems 902 and 910 within which the multi-function integrated circuit 310 of FIGS. 3-8 can be incorporated to provide touch-screen functionality, proximity/motion detection functionality, and/or gesture detection functionality. System 902 is a portable computing device, such as an iPhone®, which is commercially available from Apple Computer of Cupertino, Calif. System 902 has a transparent touch-screen substrate 904 including touch screen interface 906 and multi-function integrated circuit 310. One or more graphical elements are displayed on the touch screen interface 906 with which a user may interact by touching transparent touch-screen substrate 904 to interact with the underlying capacitive array 304 depicted in FIGS. 3-6. Further, the multi-function integrated circuit 310 is coupled to the transparent touch screen substrate 904 to provide optical proximity detection functionality, such as position detection, motion detection, and/or gesture recognition. Multi-function integrated circuit 310 is coupled to a processor of the system 902 through a host interface, such as host interface 606 in FIG. 6.

System 910 is a laptop computing device including a track pad 916 for receiving user input. In this instance, track pad 916 is implemented using the transparent touch screen substrate 302 of FIG. 3 having contact surface 914 with capacitive array 304 and multi-function integrated circuit 310. In this instance, capacitive array 304 can be used to receive user input and selections and multi-function integrated circuit 310 provides optical proximity detection functionality.

In some embodiments, transparent touch screen substrate 302 and multi-function integrated circuit 310 can be incorporated into a variety of computing devices and systems, providing optical proximity detection, motion detection, and gesture recognition functionality, as well as integrated touch screen functionality. Further, such systems can be incorporated into various control applications, such as switches, security systems, and various other computer vision-based control systems and/or proximity/motion/gesture detection-based input devices.

In conjunction with the devices, integrated circuits, and systems described above with respect to FIGS. 3-9, a device includes a multi-function integrated circuit (such as a proximity sensor die) having an active surface with a plurality of connections with connection bumps formed thereon and a plurality of photo detectors that are optically isolated from one another by the connection bumps. Multi-function integrated circuit is flip-chip mounted to a capacitive interface layer of a transparent touch screen interface including a capacitive array. Further, the multi-function integrated circuit is encapsulated from the substrate side (opposite to the active surface) by an opaque glop top epoxy. In some instances, the device includes a transparent underfill disposed between the active surface and the touch screen interface and between the connection bumps. Multi-function integrated circuit integrates photo sensor, ambient light sensor, and capacitive touch sensor functionality.

Although the present invention has been described with reference to preferred embodiments, workers skilled in the art will recognize that changes may be made in form and detail without departing from the scope of the invention.

What is claimed is:

1. An apparatus comprising:
   a semiconductor die including:
      a first surface;
      at least one photo detector formed on the first surface; and
      a plurality of connection bumps formed on the first surface and configured to at least partially obstruct light from reaching the at least one photo detector;
      a control circuit configured to determine a proximity of an object based in part on a difference between electrical signals produced by the at least one photo detector in response to received light;
      wherein the control circuit is configured to generate a signal to control a backlight intensity in response to determining the proximity; and
   a touch-screen substrate including a substantially transparent portion positioned respective to the semiconductor die such that the plurality of connection bumps are between the transparent portion and the first surface and such that the at least one photo detector receives light through the substantially transparent portion.

2. The apparatus of claim 1, further comprising an encapsulant deposited over a second surface of the semiconductor die to seal the semiconductor die to the interface surface of the touch-screen substrate.

3. The apparatus of claim 2, further comprising a transparent underfill between the plurality of connection bumps and between the semiconductor die and the touch-screen substrate.

4. The apparatus of claim 1, wherein the plurality of connection bumps at least partially block reflected light received through the touch-screen substrate from reaching the at least one photo detector.

5. The apparatus of claim 1, wherein:
   the at least one photo detector includes a first photo detector and a second photo detector to receive light including reflected light and incident light; and
   the controller is configured to detect the proximity of an object relative to the touch-screen substrate based in part on differences between first electrical signals proportional to first light received by the first photo detector and second electrical signals proportional to second light received by the second photo detector.

6. The apparatus of claim 5, wherein the controller is configured to detect motion of the object proximate to the touch-screen substrate based on changes over time in at least one of the first light and the second light.

7. The apparatus of claim 6, further comprising a light-emitting diode configured to emit infrared light above a touch surface of the touch-screen substrate;
   wherein the light includes reflected infrared light; and
   wherein at least some of the plurality of connection bumps cooperate to provide spatial dependence between the first light and the second light.

8. The apparatus of claim 1, wherein the plurality of connection bumps are arranged in an array having rows and columns; and
   wherein a spacing is substantially uniform between adjacent connection bumps within a row and within a column of the array.

9. A method comprising:
   calibrating a plurality of photo detectors of a multi-function integrated circuit to determine ambient light conditions, the multi-function integrated circuit including:
      at least one photo detector formed on a first surface;
      a plurality of connection bumps formed on the first surface and coupled to a touch-screen substrate having a substantially transparent portion, the touch-screen substrate positioned respective to the first surface such that the plurality of connection bumps are between the substantially transparent portion and the first surface and such that at least one of the plurality of connection bumps is configured to at least partially obstruct light from reaching the at least one photo detector;
   determining, using a control circuit, a proximity of an object relative to the touch-screen substrate based on electrical signals produced by the at least one photo detector, the electrical signals proportional to the light received by the plurality of photo detectors, the control circuit configured to determine the proximity of the object based in part on a difference between the electrical signals produced by the at least one photo detector in response to received light; and
   selectively generating a signal, using the control circuit, to control a backlight intensity in response to determining the proximity.

10. The method of claim 9, wherein calibrating the plurality of photo detectors comprises:
    turning off a light-emitting diode;
    measuring ambient light using at least one of the plurality of photo detectors;
    turning on the light-emitting diode; and
    measuring light using the at least one of the plurality of photo detectors to determine the proximity of the object.

11. The method of claim 9, further comprising:
    capturing a first ambient light measurement using at least one of the plurality of photo detectors;
    adjusting a backlight intensity by a predetermined amount;
    capturing a second ambient light measurement using the plurality of photo detectors; and
    determining the ambient light conditions by calculating a contribution of the backlight intensity to the first ambient light measurement and the second ambient light measurement.

12. The method of claim 11, further comprising adjusting a backlight intensity in response to determining the ambient light conditions.

13. The method of claim 9, further comprising:
- determining ratios of reflectances between pairs of the plurality of photo detectors;
- determining changes in the ratios of reflectances over time; and
- detecting motion of the object relative to the touch-screen substrate based on changes in the electrical signals over time.

14. The method of claim 9, wherein determining the proximity comprises:
- controlling at least one light source to direct light including at least one infrared frequency above a surface of the touch-screen substrate; and
- receiving light at the plurality of photo detectors, the light including at least one of ambient light and reflected light, the reflected light including the at least one infrared frequency, each of the plurality of photo detectors configured to generate an electrical signal proportional to the reflected light received by the photo detector;
- adjusting the electrical signal from each of the plurality of photo detectors based on calibrating the plurality of photo detectors to produce adjusted electrical signals; and
- determining the proximity in response to the adjusted electrical signals.

15. An apparatus comprising:
- a touch-screen substrate having a substantially transparent portion and an interface surface with an interconnect layer; and
- a semiconductor die including a first surface having at least one photo detector and a plurality of connection bumps coupled to the interconnect layer, at least one of the plurality of connection bumps arranged to at least partially block light that passes through the substantially transparent portion from being received by at least one photo detector, the semiconductor die further including:
  - a control circuit configured to determine a proximity of an object based in part on a difference between electrical signals produced by the at least one photo detector in response to received light, the control circuit configured to generate a signal to control a backlight intensity in response to determining the proximity.

16. The apparatus of claim 15, wherein the plurality of connection bumps enhance spatial dependence of reflected light received by a first photo detector of the at least one photo detector relative to a second photo detector of the at least one photodetector.

17. The apparatus of claim 15, further comprising an encapsulant deposited over a second surface of the semiconductor die to seal the semiconductor die to the interface surface of the touch-screen substrate.

18. The apparatus of claim 15, further comprising a transparent underfill between the plurality of connection bumps and between the semiconductor die and the touch-screen substrate.

19. The apparatus of claim 15, wherein the semiconductor die comprises a control circuit configured to determine a proximity of an object based in part on a difference between electrical signals produced by the at least one photo detector in response to received light.

20. The apparatus of claim 19, wherein the controller is configured to detect motion of the object proximate to the touch-screen substrate based on changes over time in at least one of first received light and second received light.

21. The apparatus of claim 20, further comprising a light-emitting diode configured to emit infrared light toward an area above a touch surface of the touch-screen substrate;
- wherein the received light includes incident light and reflected infrared light; and
- wherein at least some of the plurality of connection bumps cooperate to provide spatial dependence between the first received light and the second received light.

* * * * *